US011505498B2

(12) United States Patent
Brooks et al.

(10) Patent No.: US 11,505,498 B2
(45) Date of Patent: Nov. 22, 2022

(54) CONSTRUCTION PANEL HAVING IMPROVED FIXING STRENGTH

(71) Applicant: Saint-Gobain Placo SAS, Suresnes (FR)

(72) Inventors: Laura Brooks, Loughborough (GB); Nicola Jupp, Coventry (GB); Joanna Sparkes, Coventry (GB); Adam Richardson, Coventry (GB); Nicholas Jones, Coventry (GB); Jan Rideout, Rothley (GB); Keith Humphrey, Coventry (GB)

(73) Assignee: Saint-Gobain Placo SAS ( * ) Notice: Subject to any disclaimer, the term of this patent is extended or adjusted under 35 U.S.C. 154(b) by 173 days.

(21) Appl. No.: 16/988,773

(22) Filed: Aug. 10, 2020

(65) Prior Publication Data
US 2020/0369569 A1 Nov. 26, 2020

Related U.S. Application Data

(63) Continuation of application No. 15/527,128, filed as application No. PCT/GB2015/053534 on Nov. 19, 2015, now abandoned.

(30) Foreign Application Priority Data

Nov. 20, 2014 (GB) ..................................... 1420678

(51) Int. Cl.
| | |
|---|---|
| C04B 28/14 | (2006.01) |
| B32B 5/02 | (2006.01) |
| B32B 13/02 | (2006.01) |
| B32B 13/08 | (2006.01) |
| B27N 3/00 | (2006.01) |
| E04C 2/04 | (2006.01) |
| C04B 14/42 | (2006.01) |
| C04B 18/26 | (2006.01) |
| C04B 24/26 | (2006.01) |
| C04B 24/38 | (2006.01) |
| C04B 111/00 | (2006.01) |
| B32B 13/14 | (2006.01) |
| B32B 29/00 | (2006.01) |

(52) U.S. Cl.
CPC ............. C04B 28/14 (2013.01); B27N 3/00 (2013.01); B27N 3/002 (2013.01); B32B 5/02 (2013.01); B32B 13/02 (2013.01); B32B 13/08 (2013.01); C04B 14/42 (2013.01); C04B 18/26 (2013.01); C04B 24/2623 (2013.01); C04B 24/383 (2013.01); E04C 2/043 (2013.01); B32B 13/14 (2013.01); B32B 29/002 (2013.01); B32B 2262/101 (2013.01); B32B 2264/025 (2013.01); B32B 2264/0221 (2013.01); B32B 2264/0228 (2013.01); B32B 2264/0235 (2013.01); B32B 2264/0278 (2013.01); B32B 2264/04 (2013.01); B32B 2264/06 (2013.01); B32B 2264/067 (2013.01); B32B 2264/12 (2013.01); B32B 2307/3065 (2013.01); B32B 2419/00 (2013.01); B32B 2607/00 (2013.01); C04B 2111/0062 (2013.01); Y02W 30/91 (2015.05)

(58) Field of Classification Search
CPC . C04B 28/14; C04B 2111/0062; C04B 14/42; C04B 24/2623; C04B 24/383; B32B 13/02; B32B 13/08; B32B 2262/101; B32B 2264/0221; B32B 2264/067; B32B 2264/12; B32B 2307/3065; B32B 2607/00; B32B 5/02; B27N 3/00; B27N 3/002; E04C 2/043
USPC ........................................................ 106/780
See application file for complete search history.

(56) References Cited

U.S. PATENT DOCUMENTS

| | | | | |
|---|---|---|---|---|
| 4,748,771 | A * | 6/1988 | Lehnert .................... | E06B 5/16 428/920 |
| 4,902,348 | A * | 2/1990 | Kossatz .................. | C04B 28/14 521/100 |
| 5,155,959 | A | 10/1992 | Richards et al. | |
| 5,305,577 | A | 4/1994 | Richards et al. | |
| 5,347,780 | A | 9/1994 | Richards et al. | |
| 5,641,584 | A | 6/1997 | Andersen et al. | |
| 6,569,540 | B1 | 5/2003 | Preston et al. | |
| 2005/0126437 | A1 | 6/2005 | Tagge et al. | |
| 2007/0048549 | A1 | 3/2007 | Song et al. | |
| 2007/0059513 | A1 | 3/2007 | Yu et al. | |
| 2008/0070026 | A1 | 3/2008 | Yu et al. | |
| 2009/0085253 | A1 | 4/2009 | Kruss | |
| 2009/0152519 | A1 | 6/2009 | Francis | |
| 2009/0260918 | A1 | 10/2009 | Cao et al. | |
| 2012/0034441 | A1 | 2/2012 | Adzima et al. | |
| 2015/0114264 | A1* | 4/2015 | Taboulot ................. | C04B 24/14 106/645 |

(Continued)

FOREIGN PATENT DOCUMENTS

| | | |
|---|---|---|
| CL | 200602217 | 11/2006 |
| CL | 54239 | 2/2008 |

(Continued)

OTHER PUBLICATIONS

Translation of JP 09-227207, Patent Application H08-035023), Sep. 2, 1997. (Year: 1997).*

Primary Examiner — Hui H Chin
(74) Attorney, Agent, or Firm — Michael J. Colitz, III; GrayRobinson, P.A.

(57) ABSTRACT

A plasterboard comprising a gypsum matrix having wood particles embedded therein in an amount of at least 2 wt % relative to the gypsum, the gypsum matrix further comprising glass fibres in an amount of at least 1 wt % relative to the gypsum.

17 Claims, No Drawings

(56) References Cited

U.S. PATENT DOCUMENTS

2017/0306623 A1  10/2017  Brooks et al.
2017/0335565 A1  11/2017  Brooks et al.

FOREIGN PATENT DOCUMENTS

| CL | 200803214 | | 6/2009 | |
|----|-----------|---|--------|---|
| CL | 2017000966 A1 | | 12/2017 | |
| CL | 2017000968 A1 | | 12/2017 | |
| EP | 0236758 A2 | | 9/1987 | |
| JP | 09227207 A | * | 9/1997 | ............... B28B 1/42 |
| JP | H09227207 A | | 9/1997 | |
| JP | 2004270162 A | | 9/2004 | |
| MX | 2011010213 A | | 12/2011 | |
| WO | 9105744 A1 | | 5/1991 | |
| WO | 9404784 A1 | | 3/1994 | |
| WO | 9624486 A1 | | 8/1996 | |
| WO | 2004065319 A2 | | 8/2004 | |
| WO | 2005060628 A2 | | 7/2005 | |
| WO | 2008042060 A1 | | 4/2008 | |
| WO | 2016055807 A1 | | 4/2016 | |

* cited by examiner

CONSTRUCTION PANEL HAVING IMPROVED FIXING STRENGTH

CROSS REFERENCE TO RELATED APPLICATIONS

This application claims priority to, and is a continuation of, co-pending application Ser. No. 15/527,128, filed on May 16, 2017, entitled "Construction Panel Having Improved Fixing Strength," which itself is the U.S. National Stage entry of International Application No. PCT/GB2015/053534, filed Nov. 19, 2015, which claims priority to GB Application No. 1420678.3, filed Nov. 20, 2014. These prior applications are incorporated herein by reference in their entirety.

BACKGROUND OF THE INVENTION

Field of the Invention

The present invention relates to panels for use in building construction. In particular, the present invention relates to panels for providing partitions to which items such as sinks, televisions, or radiators may be affixed.

Background to the Invention

Light-weight panels such as plasterboard (e.g. gypsum plasterboard), polystyrene board and fibreboard are commonly used to provide partitions within buildings. Their advantages for this application include the fact that they are light and quick to install.

However, in certain cases, such light-weight panels may have the drawback that they are not strong enough to support fixtures (e.g. sinks, televisions, radiators, fire extinguishers, shelves and any other item that requires attachment to the panel). In such cases, the weight of the fixture may cause the fixing means (e.g. screws) to be pulled out of the panel, such that the fixture falls away from the partition.

This problem has previously been addressed by gluing a polymer-based backing lamina to one face of the plasterboard, the backing lamina being e.g. PVC, HDPE, Nylon, polycarbonate, Bakelite, polypropylene, acetal, or fibreglass.

SUMMARY OF THE INVENTION

It has now been found that by including wood products and a polymeric additive in the plasterboard, the plasterboard may be provided with sufficient ability to retain fixing means that no backing lamina is required.

Therefore, in a first aspect, the present invention may provide a plasterboard comprising a gypsum matrix having particles of agglomerated fibres embedded therein in an amount of at least 1 wt % relative to the gypsum, the gypsum matrix further comprising a polymeric additive, the polymeric additive being present in an amount of at least 1 wt % relative to the gypsum;
wherein
no backing lamina is attached to either face of the plasterboard.

By omitting a backing lamina, it may be possible to provide a panel having adequate fixing strength at a relatively lower cost, due to reduced raw material costs and greater ease of manufacture. Additionally, the panel may be easier to recycle, since the requirement to separate the lamina from the plasterboard may be avoided.

The term "lamina" is intended to cover polymer-based sheets having a thickness of at least 1 mm (for example 2 mm), comprising substantially PVC, HDPE, Nylon, polycarbonate, Bakelite, polypropylene, acetal, or fibreglass. The term "lamina" is used herein to refer to a sheet that is attached to a face of a plasterboard, e.g. by gluing, such that there is a defined interface between the plasterboard and the sheet. Thus, the term "lamina" is not intended to refer to objects that are partially or wholly embedded within the plasterboard.

Although no lamina is attached to either face of the plasterboard, the plasterboard may have paper facings on one or both sides thereof. In other cases, the plasterboard may have a mat partially or fully embedded at its surface, for example, a glass fibre mat.

Typically, the particles are present in an amount of at least 2 wt % relative to the gypsum, preferably at least 2.5 wt %. Typically, the particles are present in an amount of less than 10 wt % relative to the gypsum, preferably less than 8 wt %.

The particles may be, for example, wood particles (such as woodchip or fine sawdust particles) or paper particles. Preferably the particles are wood particles. In general, the particles are irregular in shape.

For the avoidance of doubt, the term "wood particles" is not intended to refer to particles of wood-derived material (such as paper particles) that have been processed to the point where individual fibres are no longer bound by the natural binders present in wood.

Typically these particles have a length that is greater than 0.5 mm. In general, these particles have a length that is less than 25 mm, preferably less than 20 mm.

Typically, these particles have a thickness than is less than 4 mm, preferably less than 3 mm. In the case that the particles are paper particles, their thickness is typically less than 0.5 mm.

In certain embodiments, the particles may be wood particles and the plasterboard may further comprise glass fibres. In such cases, the glass fibres are preferably present in an amount of at least 1 wt %.

Typically, the polymeric additive is present in an amount of at least 2 wt % relative to the gypsum, preferably at least 4 wt %.

Typically, wherein the polymeric additive is selected from group comprising polyvinyl acetate, poly vinyl acetate-ethylene co-polymer, polyvinyl pyrrolidone crosslinked with polystyrene sulfonate, polyvinyl alcohol, methyl cellulose, hydroxyethyl methyl cellulose, styrene-butadiene copolymer latex, acrylic ester latex, acrylic copolymer latex, polyester resin, epoxy resin, polymethyl methacrylate, polyacrylic acid, cationic starch, ethylated starch, dextrin and mixtures thereof.

Preferably, the polymeric additive is one of polyvinyl acetate and starch.

In certain cases, the starch may be a native starch (that is, an unmodified starch). In other cases, the starch may be a modified starch, for example, an acid-thinned starch.

Most preferably, the polymeric additive is polyvinyl acetate.

In a second aspect, the present invention may provide a plasterboard comprising a gypsum matrix having wood particles embedded therein in an amount of at least 2 wt % relative to the gypsum, the gypsum matrix further comprising glass fibres in an amount of at least 1 wt % relative to the gypsum.

Typically, no backing lamina is attached to either face of the plasterboard.

The term "lamina" is intended to cover polymer-based sheets having a thickness of at least 1 mm (for example 2 mm), comprising substantially PVC, HDPE, Nylon, polycarbonate, Bakelite, polypropylene, acetal, or fibreglass. The term "lamina" is used herein to refer to a sheet that is attached to a face of a plasterboard, e.g. by gluing, such that there is a defined interface between the plasterboard and the sheet. Thus, the term "lamina" is not intended to refer to objects that are partially or wholly embedded within the plasterboard.

Although no lamina is attached to either face of the plasterboard, the plasterboard may have paper facings on one or both sides thereof. In other cases, the plasterboard may have a mat partially or fully embedded at its surface, for example, a glass fibre mat.

In general, the wood particles are irregular in shape.

Typically the wood particles have a length that is greater than 0.5 mm. In general, these particles have a length that is less than 25 mm, preferably less than 20 mm.

Typically, the wood particles have a thickness than is less than 4 mm, preferably less than 3 mm.

In certain embodiments of the first or second aspects of the invention, the plasterboard has paper facings. These paper facings may comprise both cellulose fibres and glass fibres, as this is thought to improve the fire resistance of the plasterboard. In other cases, the plasterboard may have a mat partially or fully embedded at its surface, for example, a glass mat.

In certain embodiments of the first or second aspects of the invention, the gypsum matrix comprises a hydrophobic additive, such as silicone oil or wax.

In certain embodiments of the first or second aspects of the invention, the gypsum matrix may contain a biocide.

In certain embodiments of the first or second aspects of the invention, the gypsum matrix may contain an anti-shrinkage agent such as unexpanded vermiculite, microsilica, and/or clay, in order to improve the fire-resistance of the product.

Certain embodiments of the first or second aspects of the invention may include foam or lightweight aggregate such as perlite. Such additives are known in the art to produce lower-density boards having acceptable thickness.

DETAILED DESCRIPTION

The invention will now be described by way of example only.

Gypsum plasterboards were prepared using the following general methodology:

Stucco and other dry additives (including woodchips) were weighed into a bag and shaken to mix them. Water and wet additives were weighed into a bowl and mixed using an electric mixer for 60 s.

The dry powdered additives were added to the wet additives in the bowl and mixed in with the electric mixer for 30 s.

The resultant slurry was sandwiched between two sheets of paper liner and allowed to hydrate for 25 minutes measured from the time of mixing. The board was then dried in an oven for 1 hour at 160° C.

The panels had a thickness of 12.5 mm.

COMPARATIVE EXAMPLE 1

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm;
corn starch (Merifilm from Tate & Lyle) in an amount of 6 wt % relative to the stucco.

COMPARATIVE EXAMPLE 2

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm;
polyvinyl acetate (Vinamul 8481) in an amount of 6 wt % relative to the stucco.

EXAMPLE 1

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm;
corn starch (Merifilm from Tate & Lyle) in an amount of 12 wt % relative to the stucco;
glass fibres in an amount of 2 wt % relative to the stucco.

EXAMPLE 2

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm;
polyvinyl acetate (Vinamul 8481) in an amount of 12 wt % relative to the stucco;
glass fibres in an amount of 2 wt % relative to the stucco.

EXAMPLE 3

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm;
glass fibres in an amount of 2 wt % relative to the stucco.

COMPARATIVE EXAMPLE 3

A gypsum plasterboard was prepared from a slurry containing the following ingredients:
stucco;
woodchips in an amount of 3 wt % relative to the stucco. The woodchips had a maximum dimension in the range 1-20 mm and a thickness of 0.5-3 mm.

Screw Pull-Out Strength

Screw pull-out tests were carried out on samples measuring 100 mm by 100 mm that had been conditioned at a temperature of 23° C. and a relative humidity of 50%. A 50 mm single thread wood screw was inserted into the sample, passing through a metal load transfer element positioned on the surface of the sample. The load transfer element has a first portion that is configured to lie between the screw head and the surface of the sample, and a second portion that is configured to engage with a testing machine so as to allow a load to be applied to the screw along the axis of the screw. The screw was tightened to a torque of 1 Nm.

The specimen was then mounted in a Zwick Universal Testing Machine and a 10N pre-load applied to the screw along the axis of the screw. Subsequently, the load was increased by setting a constant cross-head speed of 10 mm/minute until pull out was achieved.

The results are set out in Table 1. These are averages, each taken from 8 samples.

TABLE 1

| Example | Average screw pull-out strength |
|---|---|
| Comparative Example 1 | 523 ± 88 |
| Comparative Example 2 | 795 ± 93 |
| Example 1 | 794 ± 82 |
| Example 2 | 1097 ± 131 |
| Example 3 | 336 ± 46 |
| Comparative Example 3 | 177 ± 95 |

The invention claimed is:

1. A plasterboard comprising a gypsum matrix having wood particles embedded therein in an amount of at least 2 wt % and less than 8 wt % relative to the gypsum, the gypsum matrix further comprising glass fibres in an amount of at least 1 wt % relative to the gypsum; and wherein no backing lamina is attached to either face of the plasterboard.

2. A plasterboard according to claim 1, wherein the maximum dimension of the particles is in the range 0.5-25 mm.

3. A plasterboard according to claim 1, wherein the plasterboard has a paper facing on one or both sides thereof.

4. A plasterboard according to claim 1, wherein the plasterboard has a mat partially or fully embedded at its surface.

5. A plasterboard according to claim 4, wherein the mat is a glass fibre mat.

6. A plasterboard according to claim 1, wherein the wood particles are irregular in shape.

7. A plasterboard according to claim 1, wherein the wood particles have a length that is greater than 0.5 mm.

8. A plasterboard according to claim 1, wherein the wood particles have a length that is less than 25 mm.

9. A plasterboard according to claim 1, wherein the wood particles have a thickness that is less than 4 mm.

10. A plasterboard according to claim 3, wherein the paper facing comprises both glass fibres and cellulose fibres.

11. A plasterboard according to claim 1, wherein the gypsum matrix comprises a hydrophobic additive.

12. A plasterboard according to claim 11, wherein the hydrophobic additive is silicone oil or wax.

13. A plasterboard according to claim 1, wherein the gypsum matrix comprises an anti-shrinkage agent.

14. A plasterboard according to claim 13, wherein the anti-shrinkage agent is unexpanded vermiculite, microsilica, and/or clay.

15. A plasterboard according to claim 1, wherein the plasterboard comprises foam.

16. A plasterboard according to claim 1, wherein the plasterboard comprises a lightweight aggregate.

17. A plasterboard according to claim 16, wherein the lightweight aggregate is perlite.

* * * * *